United States Patent Office

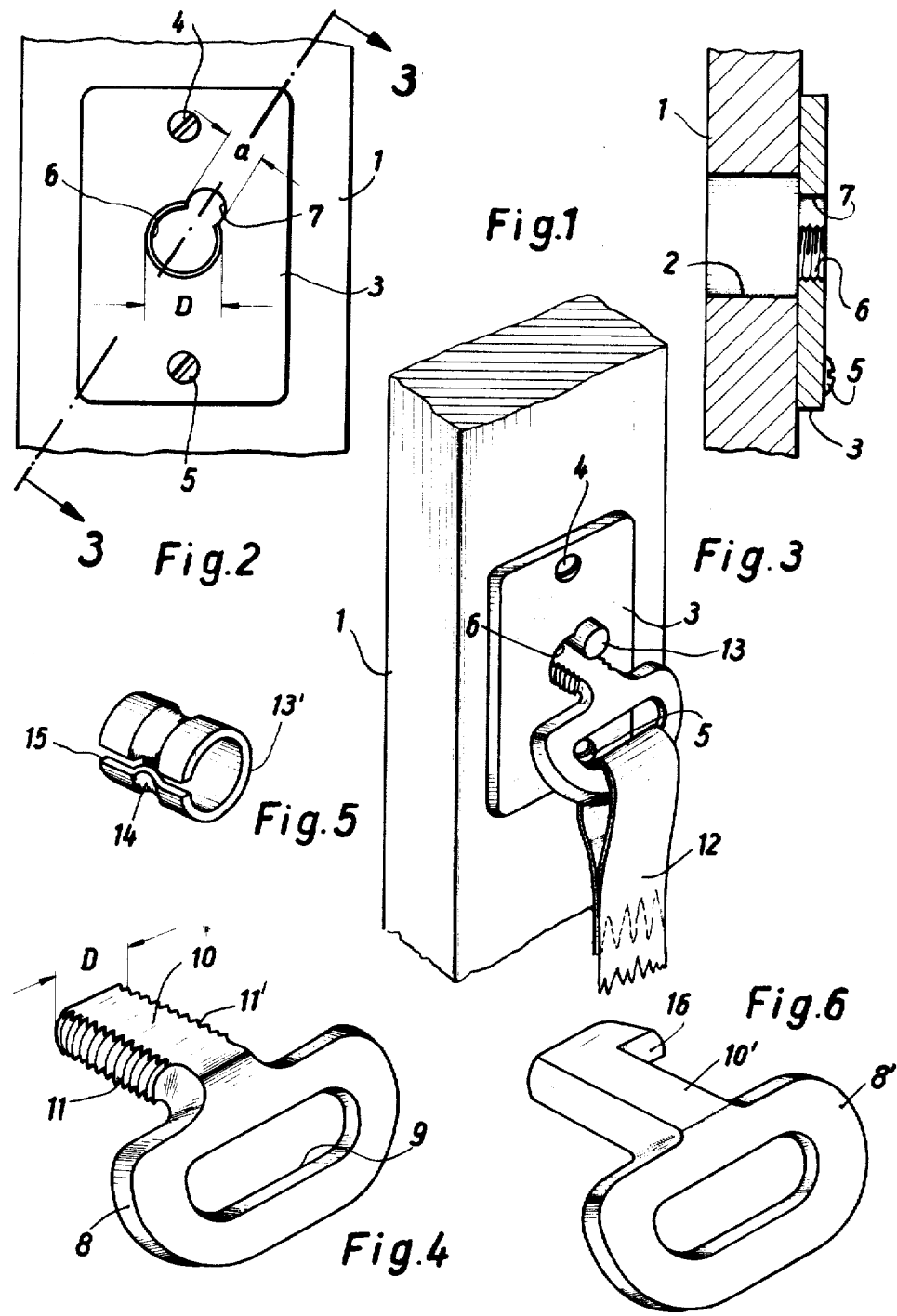

3,531,834
Patented Oct. 6, 1970

3,531,834
ANCHORAGE, PARTICULARLY FOR SAFETY
BELTS FOR MOTOR VEHICLES
Per-Olaf Weman, Hamburg-Garstedt, Germany, assignor
to Sigmatex AG, Basel, Switzerland, a firm
Filed July 26, 1968, Ser. No. 748,056
Claims priority, application Germany, Aug. 24, 1967,
1,655,079
Int. Cl. A44b 21/00
U.S. Cl. 24—221
8 Claims

ABSTRACT OF THE DISCLOSURE

The invention provides an anchorage, particularly for safety belts for the occupants of motor vehicles, which comprises a fitting attachable to a safety belt, an anchoring plate fixable to a post and provided with an opening into which a shank projecting from the fitting holding the safety belt is rotatably insertable, and a locking pin which prevents the fitting and its shank from being turned in the opening through a complete 360° turn and from being extracted from the anchoring plate.

Background of the invention

This invention relates to an anchorage, particularly for anchoring safety belts for the occupants of motor vehicles, comprising a fitting which is attached to the belt and which is rotatably received into an anchoring member.

For anchoring a safety belt to the door post of a motor vehicle the usual practice is to screw a bolt which rotatably carries the fitting of the safety belt into a threaded hole in a plate on the back of the door post. In order to prevent the fitting from rattling on the bolt when the vehicle jolts, a plastics sleeve is usually mounted on the bolt, the ends of the sleeve having shoulders which retain it in a hole in the fitting. Spacing and locking washers are also mounted on the bolt to prevent it from working loose.

Apart from the cost of producing this rather large number of partly high-quality parts, the known anchorages are also open to the objection that their fixation involves a not inconsiderable amount of labor which has a significant effect on overall cost, bearing in mind the large numbers of such fittings and anchorages needed in a modern car assembly plant.

Another drawback of the known anchorages is that the fitting on its anchorage can turn freely about its axis, i.e. through an angle of 360°. As a matter of experience the user of say a three-point safety belt comprising a shoulder strap connected to a waist strap tends to turn the fitting of such a belt about the anchoring pin when the belt appears to be twisted, although in fact the twist is a false twist. When the anchoring pin has thus been rotated the real twist thus produced is then very troublesome to remove. It is therefore far better to anchor the fitting of the belt in such a way that it cannot turn through a full revolution and that its ability to turn is restricted, though sufficient to permit the belt to adjust itself to the direction of the pulling forces.

Summary of the invention

It is therefore the object of the present invention to provide an anchorage which comprises fewer parts than the known anchorages, and which is therefore cheaper to make, easier and less troublesome to fit, and which also prevents the fitting holding the belt from turning through more than a limited angle.

To attain this object the present invention provides an anchorage, particularly for safety belts for the occupants of motor vehicles, which comprises (a) a fitting consisting of an attachment means for a safety belt and a shank projecting from said attachment means rearwardly thereof (b) an anchoring plate adapted to be fixed to a post and provided with an opening into which the shank of the fitting is insertable, and (c) a locking pin also insertable into the opening and preventing the shank of the fitting from being turned in the opening through a complete 360° turn and from being extracted from the anchoring plate.

Such an anchorage can be very easily established simply by inserting the shank of the fitting into the opening and by then driving the locking pin into place. This obviates the need of securing a part of the anchorage in the conventional manner with the aid of a torque-limiting spanner or a like tool, since the insertion of the locking pin is sufficient to prevent the fitting from being extracted and from being turned through one or more complete turns and from thus causing the belt to be twisted.

With a view to reducing the cost of production to a minimum and enabling the anchorage to be established in the most convenient way, the opening in the plate for the reception of the shank may be a round hole circumferentially intersected by a second hole for insertion thereinto of the locking pin so that part of the circumference of the inserted locking pin will project into the hole provided for the reception of the shank. The two intersecting holes in the anchoring plate can be produced in a single punching operation. The locking pin prevents the shank of the fitting from making a complete turn in its hole by virtue of its circumference partly projecting into the hole containing the shank. Extraction of the fitting from its hole can be readily prevented by providing the shank of the fitting and the hole for its reception with cooperating screw threads. However, this does not mean that the fitting need be screwed into the anchoring plate. For example, the shank may be of flat plate-shaped construction permitting the shank to be inserted by taking advantage of the full combined width of the two intersecting holes, engagement of the threads taking place when, after insertion of the shank, the locking pin is forced into place and displaces the shank until the threads interengage and prevent reextraction.

As an alternative to providing screw threads it is also within the scope of the present invention to provide the free end of the shank with one or more hook-shaped retaining projections. In order to ensure that the locking pin cannot work loose, the latter may be provided with an annular groove for cooperation with the circumferential edge of its hole in the anchoring plate when the pin is in locking position. The insertion of the pin which may be driven home with the aid of a pin-driving gun can be facilitated by contriving the pin in the manner of an axially split expanding sleeve which is slightly compressed during insertion into its hole, and which then expands into engagement with the edge of the hole.

Brief description of the drawing

Embodiments of the invention will now be described by way of example with reference to the accompanying drawing in which:

FIG. 1 is a perspective view of an anchorage, according to the invention;

FIG. 2 is a top plan view of an anchoring plate which is affixed to a door post;

FIG. 3 is a section taken on the line III—III of FIG. 2;

FIG. 4 is a perspective view of a fitting for a safety belt and formed with a shank provided with screw threads;

FIG. 5 is a similar view of a locking pin in the form of a split expanding sleeve, and FIG. 6 is a similar view of a fitting according to another embodiment formed with a shank having a hook-shaped retaining projection.

DESCRIPTION OF THE PREFERRED EMBODIMENTS

For affixation of the anchorage illustrated in FIGS. 1 to 4 to a door post 1 of a vehicle the door post 1 is provided with a recess 2 over which an anchoring plate 3 is secured by means of bolts 4 and 5. The center of the plate 3 has a threaded round hole 6 of a diameter D and a second hole 7 which circumferentially intersects the first threaded hole 6. The end of a safety belt 12 is attached to the ring 9 of a fitting 8 which is formed with a shank 10 projecting rearwardly from the ring 9 at an angle of inclination to the plane of the ring 9. This shank 10 is of flat plate-shaped cross section and has screw threads 11 and $11^1$ cut into its rounded narrower sides. The diameter of the shank 10 across the threads 11 and $11^1$ is likewise D so that the threads on the shank 10 can be turned into engagement with the threads in the threaded hole 6.

In order to prevent the fitting 8 from being extracted from its threaded hole 6 in the anchoring plate 3 and from being turned about the axis of the shank 10 through 360° a locking pin 13 of circular cross section is insertable into the second hole 7 after the shank 10 has been screwed into engagement with the threads in the threaded hole 6. As will be understood from FIG. 5 this locking pin may have the form of an axially split expanding sleeve $13^1$ provided with an annular depression or a groove 14 which cooperates with the edge of the second hole 7 in the anchoring plate 3 when the axially split expanding sleeve $13^1$ has ben inserted therein, as well as with an axial gap 15 which permits the axially split expanding sleeve $13^1$ to be compressed sufficiently for its insertion.

The fitting $8^1$ shown in FIG. 6 is not provided with screw threads but has a shank $10^1$ which is instead formed with a hooked-shaped projection 16 at its free end. This fitting $8^1$ can be similarly inserted into the anchoring plate 3 by taking advantage of the combined width of the two holes 6 and 7 and then turned before it is secured against reextraction and rotation through a full turn by the insertion of the locking pin 13.

The anchorage proposed by the present invention is naturally not limited in application to safety belts in motor cars. It may be readily used in other fields, for instance for securing cargo lashing nets in aircraft which likewise require a fitting that can be secured in a simple way and in such a manner that it can turn within limits without being undone.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An anchorage, particularly for safety belts for the occupants of motor vehicles, comprising
    (a) a fitting consisting of an attachment means for a safety belt and a shank projecting from said attachment means rearwardly thereof;
    (b) an anchoring plate adapted to be fixed to a post and provided with an opening into which the shank of the fitting is insertable, and
    (c) a locking pin also insertable into the opening and means of said shank an opening coactig with said locking pin when inserted for preventing the shank of the fitting from being turned in the opening through a complete 360° turn and from being extracted from the anchoring plate.

2. An anchorage according to claim 1, wherein the opening in the anchoring plate comprises a round hole for the insertion therein of the shank of the fitting and a second hole intersecting the circumference of the round hole for the reception of the locking pin.

3. An anchorage according to claim 2, wherein the round hole for the reception of the shank and the shank are provided with interengageable threads.

4. An anchorage according to claim 1, wherein the shank has the form of a flattened bar.

5. An anchorage according to claim 1, wherein the shank is formed with a terminal hook-shaped projection.

6. An anchorage according to claim 1, wherein the locking pin is provided with an annular groove.

7. An anchorage acocrding to claim 1, wherein the locking pin has the form of an axially split expanding sleeve.

8. An anchorage according to claim 1, wherein the shank projects from the attachment means at an angle of inclination to the plane of said attachment means.

References Cited

UNITED STATES PATENTS

| | | | |
|---|---|---|---|
| 962,086 | 6/1910 | Jones | 24—221 |
| 2,567,069 | 9/1951 | Harley | 24—221 |
| 2,595,485 | 5/1952 | Roman | 24—221 |
| 2,931,087 | 4/1960 | Farrar et al. | 24—221 |
| 3,080,634 | 3/1963 | Lindblad | 24—221 |
| 3,367,000 | 2/1968 | Schluter | 24—221 |

STEPHEN J. NOVOSAD, Primary Examiner